United States Patent
Dietl et al.

[11] Patent Number: 6,011,484
[45] Date of Patent: Jan. 4, 2000

[54] SYSTEM AND METHOD FOR CONTROLLING REFUELLING OF A MOTOR VEHICLE

[75] Inventors: Max Dietl, Straubing; Werner Gruenberger, Starnberg, both of Germany

[73] Assignee: Bayerische Motoren Werke Aktiengesellschaft, Munich, Germany

[21] Appl. No.: 08/862,474

[22] Filed: May 23, 1997

[30] Foreign Application Priority Data

| May 23, 1996 | [DE] | Germany | 196 20 873 |
| Jul. 17, 1996 | [DE] | Germany | 196 28 878 |

[51] Int. Cl.[7] ........................ G06F 7/04
[52] U.S. Cl. .............. 340/825.31; 340/825.34; 307/10.1; 307/10.3; 307/10.5; 307/10.6
[58] Field of Search ............. 340/825.31, 825.32, 340/426, 542, 430; 307/10.1, 10.2, 10.5, 10.3, 10.6; 123/399, 179.3, 325, 339.17, 339.23, 418, 479, 179.2; 180/65.4, 197, 287, 289, 271; 701/114, 36, 45; 318/563, 565

[56] References Cited

U.S. PATENT DOCUMENTS

| 2,028,515 | 1/1936 | McClanahan | 123/146.5 |
| 4,402,217 | 9/1983 | Higashiyama | 73/117.3 |
| 4,811,984 | 3/1989 | Hempel | 296/97.22 |
| 5,101,786 | 4/1992 | Kamio et al. | 123/399 |
| 5,146,891 | 9/1992 | Nakazawa et al. | 123/325 |
| 5,278,547 | 1/1994 | Suman et al. | 340/825.32 |
| 5,533,766 | 7/1996 | Farber | 292/144 |
| 5,566,562 | 10/1996 | Fujii | 70/277 |
| 5,900,823 | 5/1999 | Coll-Cuchi | 340/825.32 |

FOREIGN PATENT DOCUMENTS

| 1 202 680 | 12/1963 | Germany . |
| 35 08 550 | 10/1985 | Germany . |
| 34 38 342 | 4/1986 | Germany . |
| 37 28 601 | 9/1988 | Germany . |
| 41 26 130 | 2/1993 | Germany . |
| 41 35 094 | 4/1993 | Germany . |
| 43 07 454 | 4/1994 | Germany . |
| 42 43 883 | 6/1994 | Germany . |
| 44 00 932 | 6/1994 | Germany . |
| 692 01 552 | 7/1995 | Germany . |
| 44 04 014 | 8/1995 | Germany . |
| 44 29 135 | 8/1995 | Germany . |

*Primary Examiner*—Michael Horabik
*Assistant Examiner*—Jean B. Jeanglaude
*Attorney, Agent, or Firm*—Evenson McKeown Edwards & Lenahan, PLLC

[57] ABSTRACT

A system and method for controlling refuelling of a motor vehicle having an internal-combustion engine and having a control unit for a central locking system and several locking/unlocking devices (VEEs) for doors and covers which are controlled by the control unit. The locking and unlocking device of the filler inlet compartment cover can be switched by the control unit independently of the other locking and unlocking devices. When the filler neck cap and/or the filler inlet compartment cover is open, the internal-combustion engine cannot be started. When the internal-combustion engine is running, the filler inlet compartment cover cannot be unlocked.

12 Claims, 1 Drawing Sheet

SYSTEM AND METHOD FOR CONTROLLING REFUELLING OF A MOTOR VEHICLE

BACKGROUND AND SUMMARY OF THE INVENTION

This application claims the priority of German Application Nos. 196 20 873.4 and 196 28 878.9, the disclosures of which are expressly incorporated by reference herein.

The invention relates to a system and method for controlling refuelling of a motor vehicle having an internal-combustion engine and having a control unit for a central locking system and several locking/unlocking devices (VEEs) for doors and covers which are controlled by the control unit.

Although it is prohibited in various countries to refuel a vehicle during the operation of the drive unit, for example, of an internal-combustion engine, this frequently takes place because the law is not known. Because of the simultaneous operation of all locking and unlocking devices (VEEs) by the control unit in the same manner; that is, jointly in the unlocking or in the locking manner, it is not possible to permit the refuelling of the vehicle only when this is compatible with the legal regulations. The ability to control only the locking and unlocking device of a vehicle door, as a rule of the driver side vehicle door, independently of the locking and unlocking devices of the other doors and covers which is provided in the case of central locking systems also provides no protection against refuelling the vehicle when it is prohibited because the uncoupling of the locking and unlocking device of the one door takes place independently of the operation of the vehicle.

On the other hand, it may happen that, after the refuelling, the operation of the vehicle is restarted although the filler cap is not closed. A result may be, for example, damage to the fuelling system and/or to the vehicle when the vehicle drives away while the fuelling device is still connected with the vehicle.

It is an object of the invention to provide a system and method for controlling refuelling of a motor vehicle which allows refuelling and operation of the vehicle only independently of one another.

This and other objects have been achieved according to the present invention by providing a system for controlling refuelling of a motor vehicle having an internal-combustion engine, comprising: a filler inlet compartment cover which is movable between a closed position and an open position; a cover sensor which outputs signals corresponding to whether the filler inlet compartment cover is in the closed position or the open position; and a control unit which receives the signals from the cover sensor, and which controls an on/off state of operation of the internal-combustion engine such that the engine cannot be turned to the on state of operation when the filler inlet compartment cover is in the open position.

According to certain preferred embodiments, the system further comprises: a filler neck cap which is movable between a closed position and an open position; a cap sensor which outputs signals corresponding to whether the filler neck cap is in the closed position or the open position; the control unit receiving signals from the cap sensor, and controlling an on/off state of operation of the internal-combustion engine such that the engine cannot be turned to the on state of operation when the filler neck cap is in the open position.

According to certain other preferred embodiments, the filler inlet compartment cover can be locked and unlocked by a locking mechanism, the control unit controlling the locking mechanism such that the filler inlet compartment cover cannot be unlocked when the internal-combustion engine is in the on state of operation.

This and other objects have also been achieved according to the present invention by providing a method of controlling refuelling of a motor vehicle having an internal-combustion engine and a filler inlet compartment cover which is movable between a closed position and an open position, comprising: sensing whether the filler inlet compartment cover is in the closed position or the open position; and controlling an on/off state of operation of the internal-combustion engine such that the engine cannot be turned to the on state of operation when the filler inlet compartment cover is in the open position.

According to certain preferred embodiments, the motor vehicle has a filler neck cap which is movable between a closed position and an open position, and the method further comprises: sensing whether the filler neck cap is in the closed position or the open position; and controlling an on/off state of operation of the internal-combustion engine such that the engine cannot be turned to the on state of operation when the filler neck cap is in the open position.

According to certain other preferred embodiments, the filler inlet compartment cover can be locked and unlocked by a locking mechanism, and the method further comprises: controlling the locking mechanism such that the filler inlet compartment cover cannot be unlocked when the internal-combustion engine is in the on state of operation.

On the one hand, an unauthorized refuelling of the vehicle is prevented. Because of the uncoupling of the locking and unlocking devices of the filler inlet compartment cover from the locking and unlocking devices of the other vehicle doors and covers, it is possible to make the driver aware of the refuelling and of a possible legal violation. It is possible, for example, to always keep the locking and unlocking devices of the filler inlet compartment cover locked and to make the unlocking dependent on a separate command, for example, by means of a push button.

In order to securely exclude an unauthorized refuelling of the vehicle which will still be possible then, the unlocking of the locking and unlocking devices of the filler inlet compartment cover can be coupled with the operation of the vehicle. For example, it may only be possible to unlock the locking and unlocking devices of the filler inlet compartment cover when the vehicle is switched off by the interruption of the main current circuit. This can take place, for example, by monitoring the position of the ignition key. When this ignition key is in the ignition lock, the locking and unlocking devices of the filler inlet compartment cover remain locked.

A possibly resulting reduction of convenience can be avoided when the locking is coupled with the operation of the drive unit. When the operation of the drive unit, for example, of the internal-combustion engine is interrupted, for example, by the interruption of the ignition circuit, the locking and unlocking devices can automatically be brought into the unlocking position by the control unit. It will then be possible to refuel the vehicle when the drive unit is switched off. For this purpose, it is not required to remove the ignition key from the ignition lock. Such a measure represents no reduction of convenience for the vehicle user. On the other hand, by referring to the operation of the drive unit, it is ensured that the vehicle will be refuelled only when the drive unit is switched off. As a result, the danger of fire, which exists during the refuelling of the vehicle with a running drive unit, can be securely avoided.

On the other hand, the connection between the operation of the internal-combustion engine and the opening and closing condition of the filler neck cap or the filler inlet compartment cover can be expanded in that care is also taken that the vehicle cannot be started when the filler neck cap or the filler inlet compartment cover is not properly closed.

This prevents the vehicle from being driven away after the conclusion of the refuelling operation while the filler inlet compartment cover is open or while the filler neck cap is not properly fitted on as well preventing the vehicle from being driven away while the filling nozzle is still inserted in the fuelling connection. Not only is the legal situation then taken into account but the accident danger in the area of the gas stations is also clearly reduced. This also prevents loss of the filler neck cap when, after the refuelling, it is not properly screwed back on. An environmental contamination because of a loss of fuel from the open tank will then also be excluded.

The information concerning a filler neck cap or filler compartment inlet cover which has not been properly closed can be furnished in different manners. Thus, it is possible to recognize the condition or the position of the filler compartment inlet cover or filler neck cap, for example, by means of a proximity switch or a sensor system operating optically.

In contrast, a clear simplification of the constructive expenditures is obtained when a contact switch in the filler neck cap or filler inlet compartment cover supplies a signal to a control unit of the internal-combustion engine. This signal may be present, for example, as long as the filler neck cap is properly closed, for example, when the filler neck cap is open or the filler inlet compartment cover is removed.

In principle, it is also possible to receive the signal, as known per se, within the scope of a central locking system. By means of this device, the locking and unlocking, for example, of the filler neck cap is controlled. The signal which is present in this connection can be used within the scope of the present invention to prevent the internal-combustion engine from being restarted if the filler neck cap or the filler inlet compartment cover are not properly fitted on.

These and other objects, features and advantages of the present invention will become more readily apparent from the following detailed description when taken in conjunction with the accompanying drawing.

DETAILED DESCRIPTION OF THE DRAWING

Figure 1:
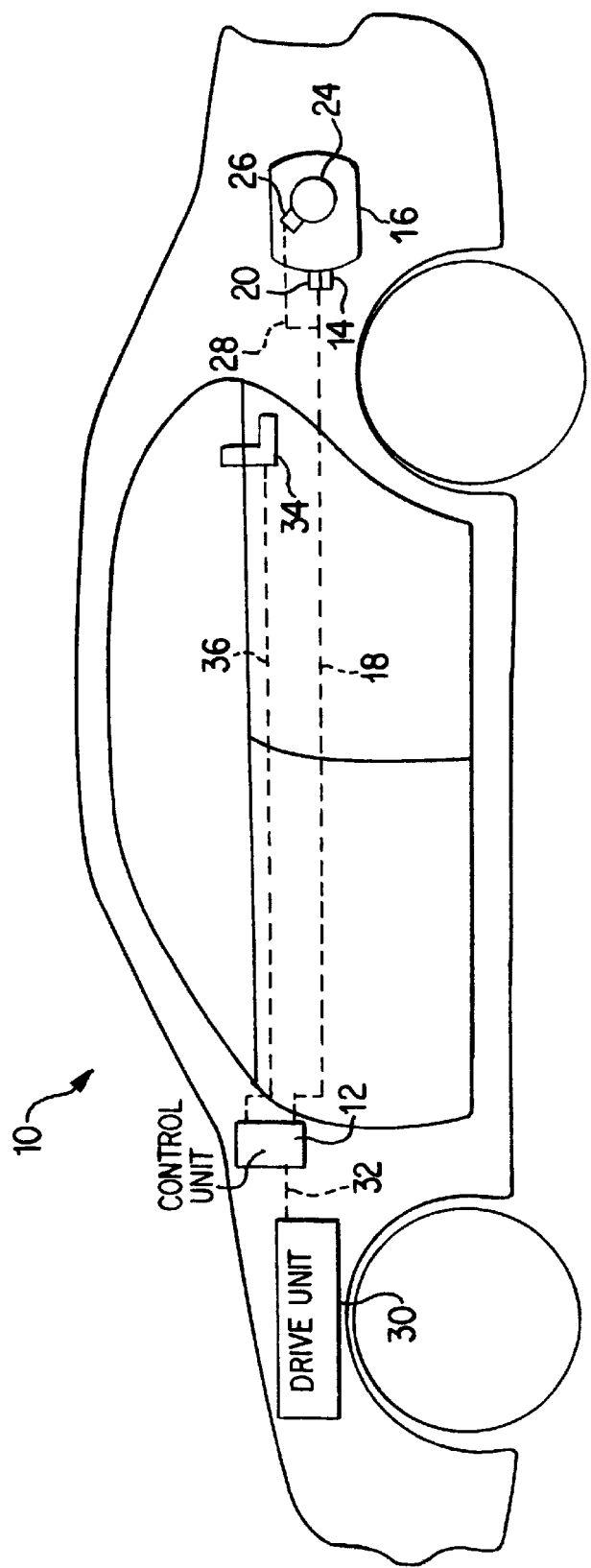
FIG. 1 is a schematic view of a system for controlling refuelling of a motor vehicle according to a preferred embodiment of the present invention.

Referring to FIG. 1, a motor vehicle 10 includes a control unit 12 which controls locking and unlocking of a locking mechanism 14 of a filler inlet compartment cover 16 via line 18 and senses the closure state (i.e., open or closed) of the filler inlet compartment cover 16 via a sensor 20, for example a contact switch, and line 22. The control unit 12 senses the closure state (i.e., closed or open) of a filler neck cap 24 via a sensor 26, for example a contact switch, and line 28. The control unit 12 senses and controls an operation state (i.e., off or on) of a drive unit 30, in this case an internal combustion engine, of the motor vehicle via line 32. The control unit 12 may also independently control locking and unlocking of other vehicle systems, for example a door locking system 34 via line 36.

When the motor vehicle 10 is to be refuelled, the control unit 12 does not allow the filler inlet compartment cover 16 to be unlocked until the drive unit 30 is shut off. In this way, the present invention prevents the hazards of refuelling while the drive unit is running. After the drive unit 30 has been shut off, the refuelling operation takes place in a known manner by unlocking and opening the filler inlet compartment cover 16, by removing the filler neck cap 24, and by placing a filling nozzle into the filler neck.

The control unit 12 senses the closure state of the filler neck cap 24 via the sensor 26 and the filler inlet compartment cover 16 via the sensor 20, and does not allow the drive unit 30 to be turned on while either of the filler neck cap 24 or the filler inlet compartment cover 16 is open. In this way, the present invention prevents the possibility of driving away while the filling nozzle is still inserted into the filler neck, as well as the possibility of driving with the filler neck cap 24 removed or the filler inlet compartment cover 16 open. Therefore, the present invention prevents loss of the filler neck cap 24, which is often placed on the motor vehicle or on the fuel pump during the refuelling operation and may be forgotten and lost if not replaced.

Although the invention has been described in detail, it is to be clearly understood that the same is by way of illustration and example, and is not to be taken by way of limitation. The spirit and scope of the present invention are to be limited only by the terms of the appended claims.

What is claimed is:

1. A system for controlling a central locking system and a refueling system of a motor vehicle having an internal-combustion engine, comprising:

a filler inlet compartment cover which is movable between a closed position and an open position;

a central locking system including at least two locking units, at least one of said locking units being a vehicle door locking unit, and one of said locking units being a locking mechanism to lock and unlock the filler inlet compartment cover;

a control unit which controls said central locking system;

a cover sensor which outputs signals to said control unit corresponding to whether said filler inlet compartment cover is in said closed or open position;

said control unit controlling an on/off state of operation of said internal-combustion engine such that said engine cannot be turned to said on state of operation when said filler inlet compartment cover is in said open position.

2. A system according to claim 1, further comprising:

a filler neck cap which is movable between a closed position and an open position;

a cap sensor which outputs signals corresponding to whether said filler neck cap is in said closed position or said open position;

said control unit receiving signals from said cap sensor, and controlling an on/off state of operation of said internal-combustion engine such that said engine cannot be turned to said on state of operation when said filler neck cap is in said open position.

3. A system according to claim 1, wherein said control unit controls said locking mechanism such that said filler inlet compartment cover cannot be unlocked when said internal-combustion engine is in said on state of operation.

4. A system according to claim 2, wherein said control unit controls said locking mechanism such that said filler inlet compartment cover cannot be unlocked when said internal-combustion engine is in said on state of operation.

5. A system according to claim 3, wherein said control unit automatically locks said locking mechanism of the filler inlet compartment cover when said internal-combustion engine is in said on state of operation.

6. A system according to claim 4, wherein said control unit automatically locks said locking mechanism of the filler inlet compartment cover when said internal-combustion engine is in said on state of operation.

7. A method of controlling a central locking system and a refueling system of a motor vehicle having an internal-combustion engine and a filler inlet compartment cover which is movable between a closed position and an open position, said central locking system including at least two locking units, at least one of said locking units being a vehicle door locking unit, and one of said locking units being a locking mechanism to lock and unlock the filler inlet compartment cover, comprising:

sensing whether said filler inlet compartment cover is in said closed position or said open position and providing a corresponding signal to a control unit of the central locking system; and controlling an on/off state of operation of said internal-combustion engine via the central locking system such that said engine cannot be turned to said on state of operation when said filler inlet compartment cover is in said open position.

8. A method according to claim 7, wherein said motor vehicle has a filler neck cap which is movable between a closed position and an open position, further comprising:

sensing whether said filler neck cap is in said closed position or said open position; and controlling an on/off state of operation of said internal-combustion engine such that said engine cannot be turned to said on state of operation when said filler neck cap is in said open position.

9. A method according to claim 7, further comprising:

controlling said locking mechanism such that said filler inlet compartment cover cannot be unlocked when said internal-combustion engine is in said on state of operation.

10. A method according to claim 8, further comprising:

controlling said locking mechanism such that said filler inlet compartment cover cannot be unlocked when said internal-combustion engine is in said on state of operation.

11. A method according to claim 9, further comprising automatically locking said locking mechanism of the filler inlet compartment cover when said internal-combustion engine is in said on state of operation.

12. A method according to claim 10, further comprising automatically locking said locking mechanism of the filler inlet compartment cover when said internal-combustion engine is in said on state of operation.

* * * * *